US011550277B2

(12) United States Patent
Lovegrove

(10) Patent No.: US 11,550,277 B2
(45) Date of Patent: Jan. 10, 2023

(54) RUGGEDIZED EDGE COMPUTING ASSEMBLY

(71) Applicant: MORPHIX, INC., Vancouver, WA (US)

(72) Inventor: Jonathan Lovegrove, Yacolt, WA (US)

(73) Assignee: MORPHIX, INC., Vancouver, WA (US)

( * ) Notice: Subject to any disclaimer, the term of this patent is extended or adjusted under 35 U.S.C. 154(b) by 116 days.

(21) Appl. No.: 17/247,919

(22) Filed: Dec. 30, 2020

(65) Prior Publication Data

US 2022/0206450 A1   Jun. 30, 2022

(51) Int. Cl.

| | |
|---|---|
| *H01R 27/00* | (2006.01) |
| *G05B 19/04* | (2006.01) |
| *G05B 19/045* | (2006.01) |
| *G05B 19/048* | (2006.01) |
| *H04L 67/125* | (2022.01) |
| *G16Y 20/20* | (2020.01) |
| *G16Y 40/35* | (2020.01) |
| *G16Y 10/25* | (2020.01) |
| *G16Y 20/10* | (2020.01) |
| *H01R 13/639* | (2006.01) |
| *H01R 13/52* | (2006.01) |
| *H01R 13/73* | (2006.01) |

(52) U.S. Cl.
CPC ....... *G05B 19/0405* (2013.01); *G05B 19/045* (2013.01); *G05B 19/048* (2013.01); *G16Y 10/25* (2020.01); *G16Y 20/10* (2020.01); *G16Y 20/20* (2020.01); *G16Y 40/35* (2020.01); *H01R 13/639* (2013.01); *H04L 67/125* (2013.01); *H01R 13/5219* (2013.01); *H01R 13/73* (2013.01)

(58) Field of Classification Search
CPC ... H01R 13/639; H01R 13/5219; H01R 13/73
See application file for complete search history.

(56) References Cited

U.S. PATENT DOCUMENTS

| | | | | |
|---|---|---|---|---|
| 4,956,561 | A | * | 9/1990 | Tamer .................... H01R 29/00 174/541 |
| 5,567,180 | A | * | 10/1996 | Seo ........................ G06F 13/409 439/654 |
| 5,807,140 | A | * | 9/1998 | Hopkins ............... H01R 31/005 439/639 |
| 6,155,862 | A | * | 12/2000 | Chiu .................... H01R 13/639 439/347 |

(Continued)

*Primary Examiner* — Neil Abrams
(74) *Attorney, Agent, or Firm* — Alleman Hall Creasman & Tuttle LLP

(57) ABSTRACT

A ruggedized edge computing assembly is provided, which includes an edge computing device having a processor configured to control a controlled device. The ruggedized edge computing assembly includes a field connector configured to connect to the edge computing device via a plurality of pins and to the controlled device via a coupling. The ruggedized edge computing assembly further includes a housing overmolded around each of the field connector and the edge computing device. The housing includes two portions which are a field connector portion configured to accommodate the field connector and an edge computing device portion configured to accommodate the edge computing device. The two portions are configured to interlockingly engage together at an interface.

22 Claims, 15 Drawing Sheets

(56) References Cited

U.S. PATENT DOCUMENTS

| | | | |
|---|---|---|---|
| 6,746,284 B1 * | 6/2004 | Spink, Jr. | H01R 13/432 |
| | | | 439/651 |
| 7,351,110 B1 * | 4/2008 | Wu | G06F 3/038 |
| | | | 439/638 |
| 8,764,478 B2 * | 7/2014 | Lin | H01R 31/065 |
| | | | 439/498 |
| 8,932,084 B2 * | 1/2015 | Thackston | H01R 13/5227 |
| | | | 439/676 |
| 8,979,554 B2 * | 3/2015 | Yudate | H01R 13/5202 |
| | | | 439/732 |
| 9,300,344 B2 * | 3/2016 | Rayner | G06F 1/1626 |
| 9,515,652 B2 * | 12/2016 | Ohtani | H05K 3/3426 |
| 9,806,446 B2 * | 10/2017 | Lee | H01R 12/724 |
| 9,960,521 B2 * | 5/2018 | Armstrong | H01R 13/516 |
| 10,007,302 B2 * | 6/2018 | Brown | G01R 33/422 |
| 10,505,311 B2 * | 12/2019 | Al-Ali | H01R 13/5224 |
| 11,076,486 B2 * | 7/2021 | Wiesa | H05K 5/0034 |
| 11,398,690 B2 * | 7/2022 | Chiang | H01R 13/639 |
| 2007/0261978 A1 * | 11/2007 | Sanderson | A45F 5/021 |
| | | | 206/320 |
| 2009/0197478 A1 * | 8/2009 | Mandel | H01R 13/504 |
| | | | 439/736 |
| 2022/0137583 A1 * | 5/2022 | Lovegrove | G06N 3/08 |
| | | | 700/48 |

* cited by examiner

RUGGEDIZED EDGE COMPUTING ASSEMBLY

BACKGROUND

Internet of Things (IoT) connected devices have recently come to be used in a wide variety of settings, such as manufacturing, transportation, resource extraction, climate control for buildings, and biometrics. These IoT connected devices may include sensors with which the IoT connected devices collect data related to the physical environments in which they are located. In addition, IoT connected devices may include controllable devices that are configured to perform physical actions in response to receiving control signals. The IoT connected device may be configured to communicate with a programmable logic controller (PLC), which may be configured to communicate with an edge computing device. The edge computing device may be configured to communicate with a remotely located server computing device, which may provide cloud computing resources to the edge computing device.

SUMMARY

To address the above issues, according to one aspect of the present disclosure, a ruggedized edge computing assembly is provided herein which includes an edge computing device having a processor configured to control a controlled device. The ruggedized edge computing assembly includes a field connector configured to connect to the edge computing device via a plurality of pins and to the controlled device via a coupling. The ruggedized edge computing assembly further includes a housing overmolded around each of the field connector and the edge computing device. The housing includes two portions which are a field connector portion configured to accommodate the field connector and an edge computing device portion configured to accommodate the edge computing device. The two portions are configured to interlockingly engage together at an interface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The IoT connected devices and edge computers in conventional IoT systems are typically large, difficult to install, and vulnerable to dust, moisture, and received impacts. Particularly when the IoT systems are deployed in harsh environments such as outdoors or in a manufacturing environment with caustic chemicals present, conventional IoT systems may fail without ruggedization. Ruggedization seeks to limit a device's vulnerability to aspects of harsh environments including, for example, vibration, impacts, extreme temperature, dust and other particles, and moisture. In the conventional case, ruggedization typically includes a large enclosure to which devices are mounted and requires extensive custom installation work to provide appropriate cabling and seals. The size and extra work and therefore cost involved in conventional ruggedized IoT systems can be prohibitive for deployment in many situations.

Figure 1:
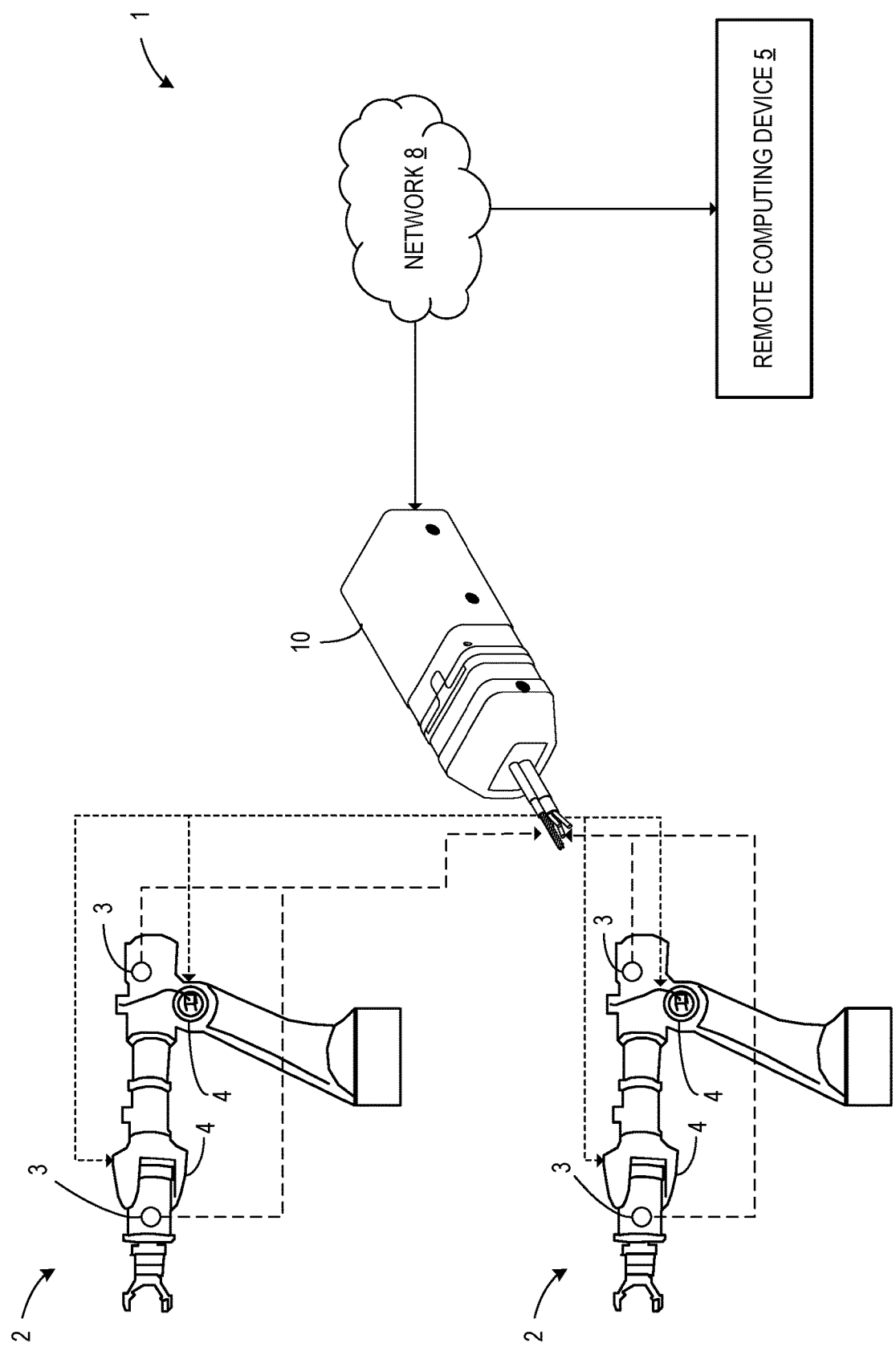
FIG. 1 shows an illustration of an example IoT system including a ruggedized edge computing assembly according to the present disclosure.
Figure 2:
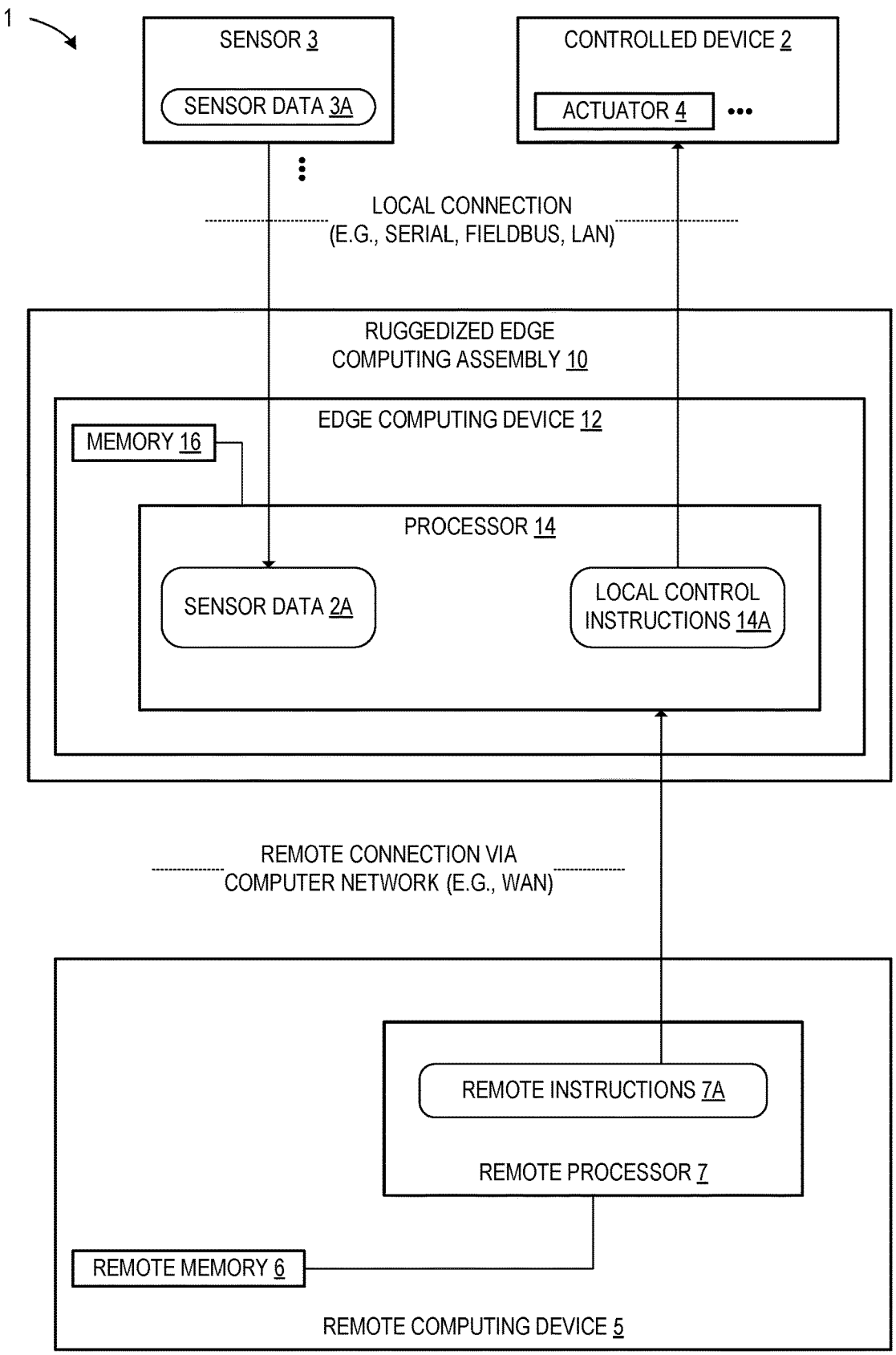
FIG. 2 shows a schematic view of the IoT system of FIG. 1.
Figure 3:
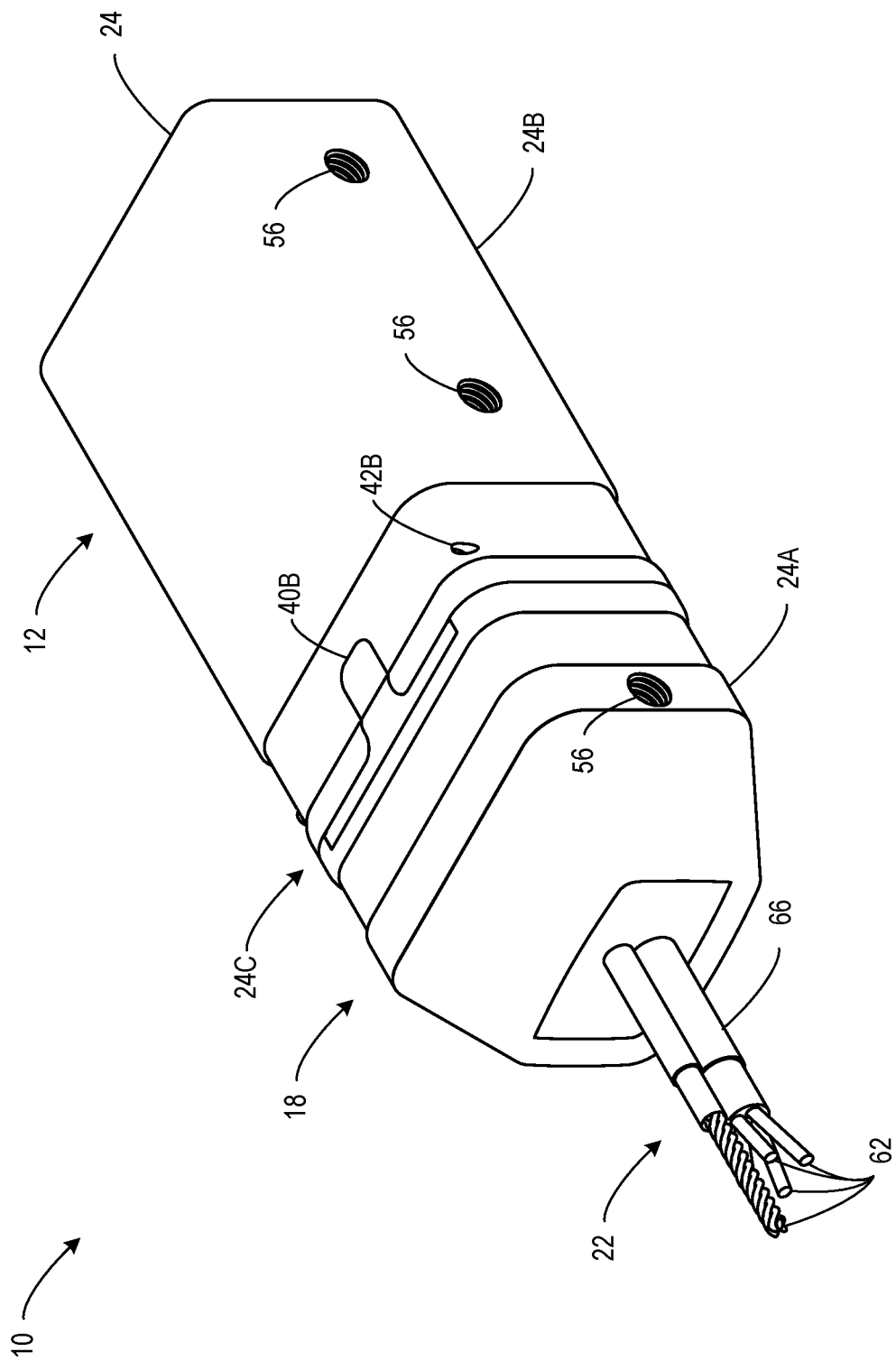
FIG. 3 shows a perspective view of the ruggedized edge computing assembly of FIG. 1.
Figure 4:
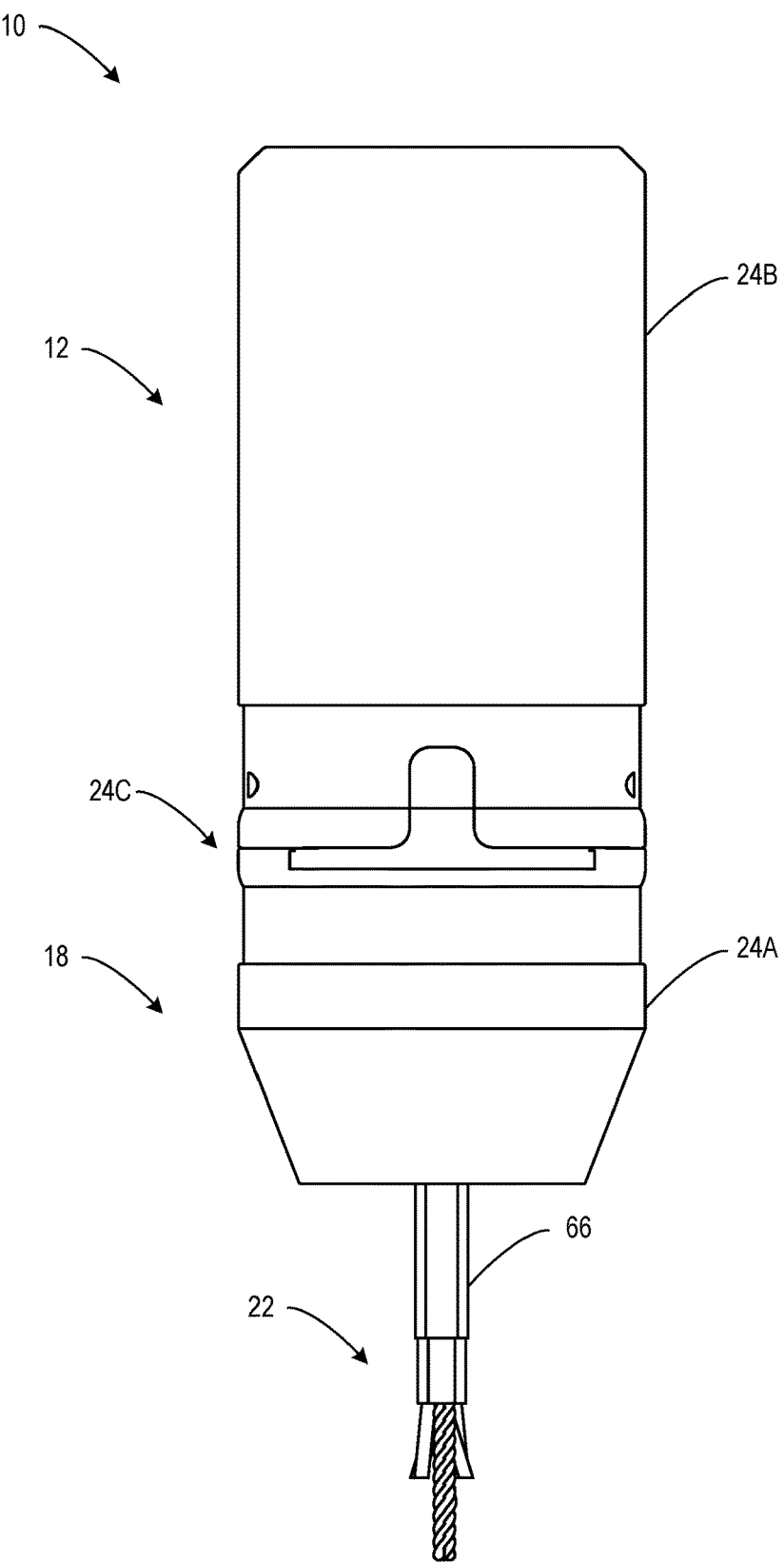
FIG. 4 shows a top view of the ruggedized edge computing assembly of FIG. 1.
Figure 5:
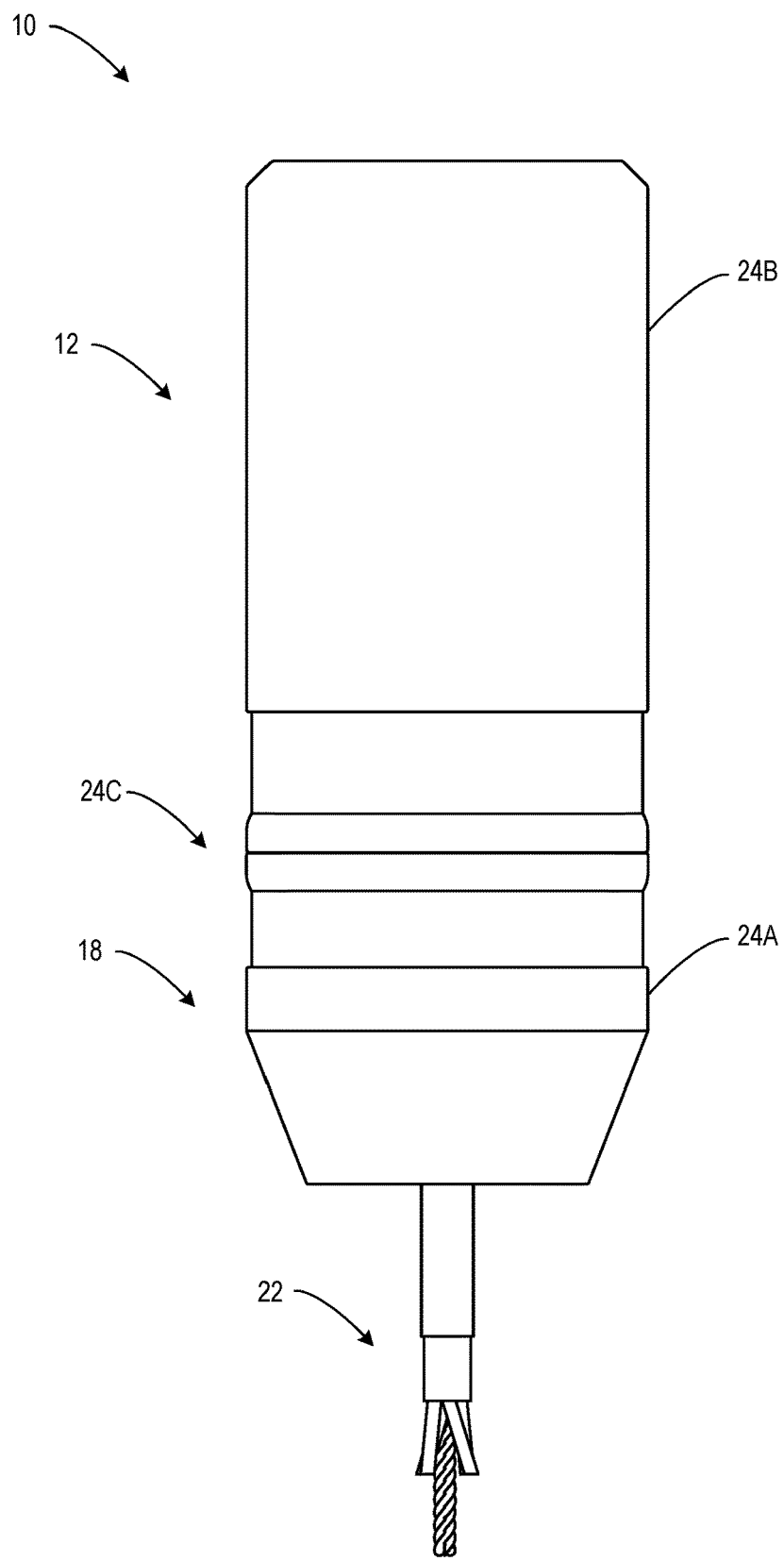
FIG. 5 shows a bottom view of the ruggedized edge computing assembly of FIG. 1.
Figure 6:
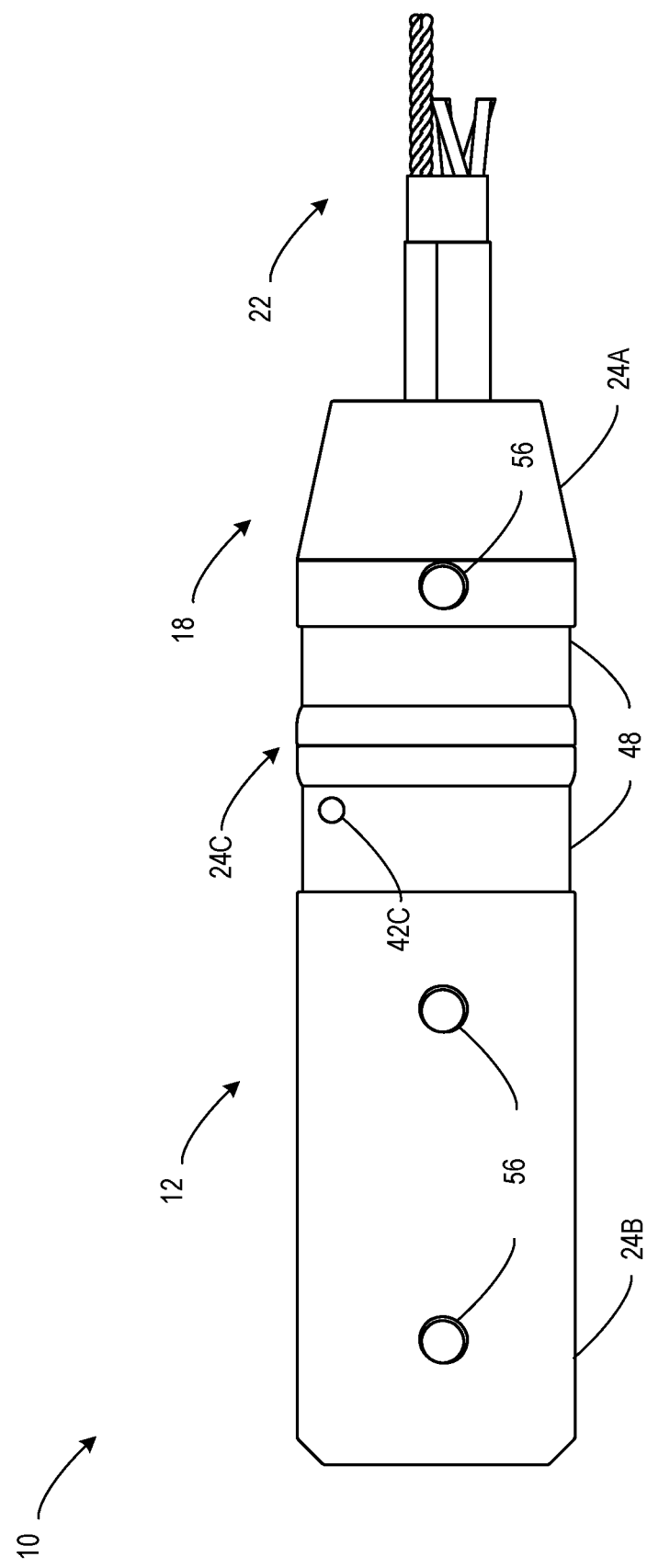
FIG. 6 shows a left view of the ruggedized edge computing assembly of FIG. 1.
Figure 7:
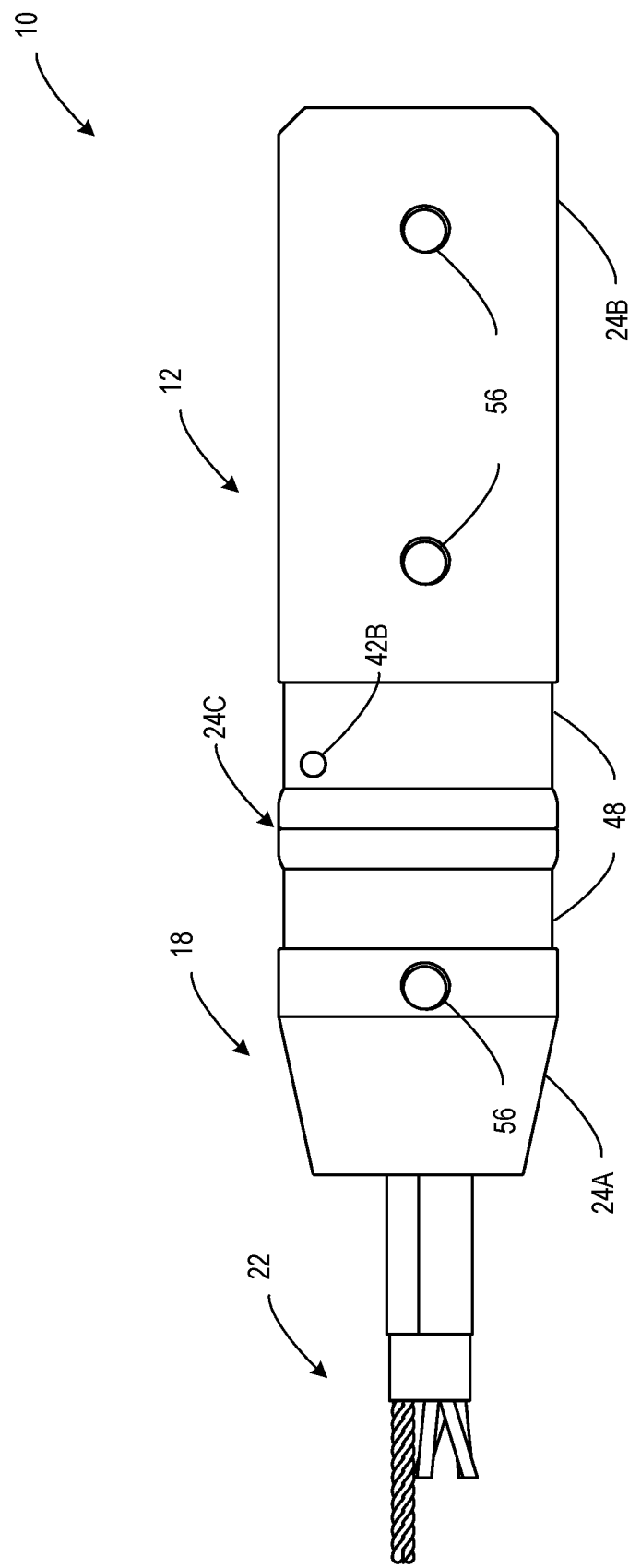
FIG. 7 shows a right view of the ruggedized edge computing assembly of FIG. 1.

In order to address the above shortcomings of conventional IoT systems, an IoT system 1 is provided, which includes a ruggedized edge computing assembly 10 according to the present disclosure. One example of the IoT system 1 is illustrated in FIG. 1 and shown schematically in FIG. 2. Briefly, the ruggedized edge computing assembly 10 may be configured to control one or more controlled devices 2 such as a robot, industrial machine, appliance, camera, microphone, sensor, light, actuator, valve, etc. The ruggedized edge computing assembly 10 may be suitable in a wide variety of settings with corresponding controlled devices 2 appropriate for a given setting. Components of the controlled device 2 such as sensors 3 and actuators 4, for example, may be controlled individually by the ruggedized edge computing assembly 10 and therefore be considered controlled devices themselves. The number of controlled devices 2 included in the IoT system 1 is not particularly limited.

The ruggedized edge computing assembly 10 may include an edge computing device 12, comprising a processor 14 configured to control the controlled device 2. The ruggedized edge computing assembly 10 may receive data such as sensor data 3A from the controlled device 2 and control the controlled device 2 by sending local control instructions 14A via communication methods that will be discussed later. The ruggedized edge computing assembly 10 may be deemed an edge device due to its position on the network topology having a local connection to the controlled device 2 and a remote connection to a remote computing device 5. The remote computing device 5 may be configured to control the ruggedized edge computing assembly 10 by sending remote instructions 7A, thereby controlling the controlled device 2 remotely. The remote computing device 5 may communicate with the ruggedized edge computing assembly 10 via a network 8 over a wired (e.g., ethernet) or wireless (e.g., a wide area network (WAN)) connection. The remote computing device 5 may include remote memory 6 for storing data and instruction and a remote processor 7 for executing instructions to perform computing tasks.

The ruggedized edge computing assembly 10 will be described below in greater detail with reference to FIGS. 3-9 which show a variety of views of one example of the ruggedized edge computing assembly 10 according to the present disclosure. The ruggedized edge computing assembly 10 may be mainly comprised of the edge computing device 12 and a field connector 18, which is configured to connect to the edge computing device 12 via a plurality of pins 20 (see FIG. 9) and to the controlled device 2 via a coupling 22. Although it is the edge computing device that includes the processor 14, the field connector 18 may in some instances include a daughter board The ruggedized edge computing assembly 10 may include a housing 24 overmolded around each of the field connector 18 and the edge computing device 12. The housing 24 may include two portions 24A, 24B which are a field connector portion 24A configured to accommodate the field connector 18 and an edge computing device portion 24B configured to accommodate the edge computing device 12. The two portions 24A, 24B may be configured to interlockingly engage together at an interface 24C. The two portions 24A, 24B may be reversibly engaged such that the two portions 24A, 24B may come apart, or may be irreversibly engaged using, for example, adhesives or fasteners that render disengagement undesirable. The interlocking features may allow the hardware of the edge computing device 12 to be mass manufactured in an identical or similar form, while the field connector 18 may be customized based on the type of the controlled devices 2 expected to be controlled.

Figure 8:
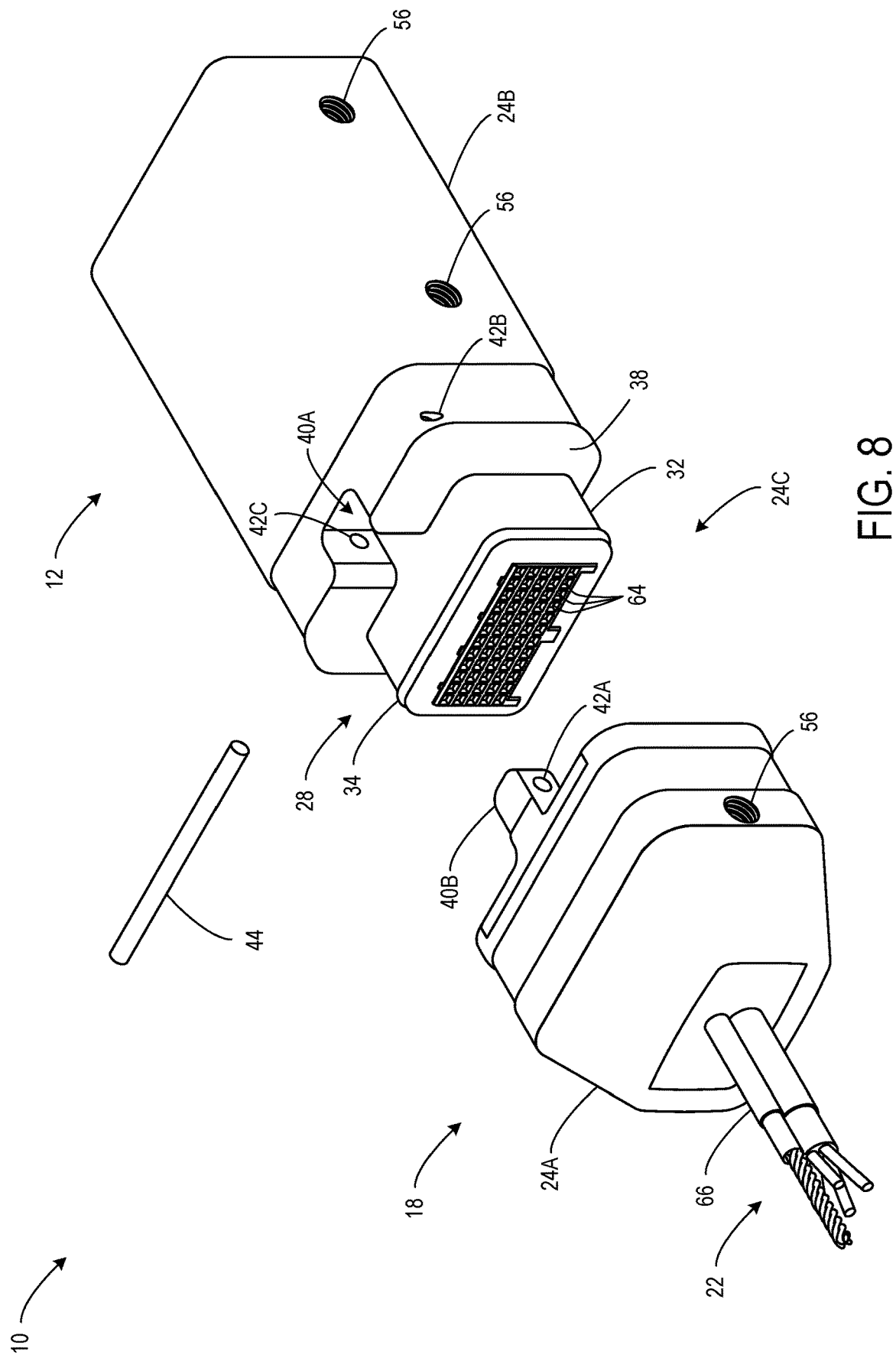
FIG. 8 shows a front perspective view of the ruggedized edge computing assembly of FIG. 1.
Figure 9:
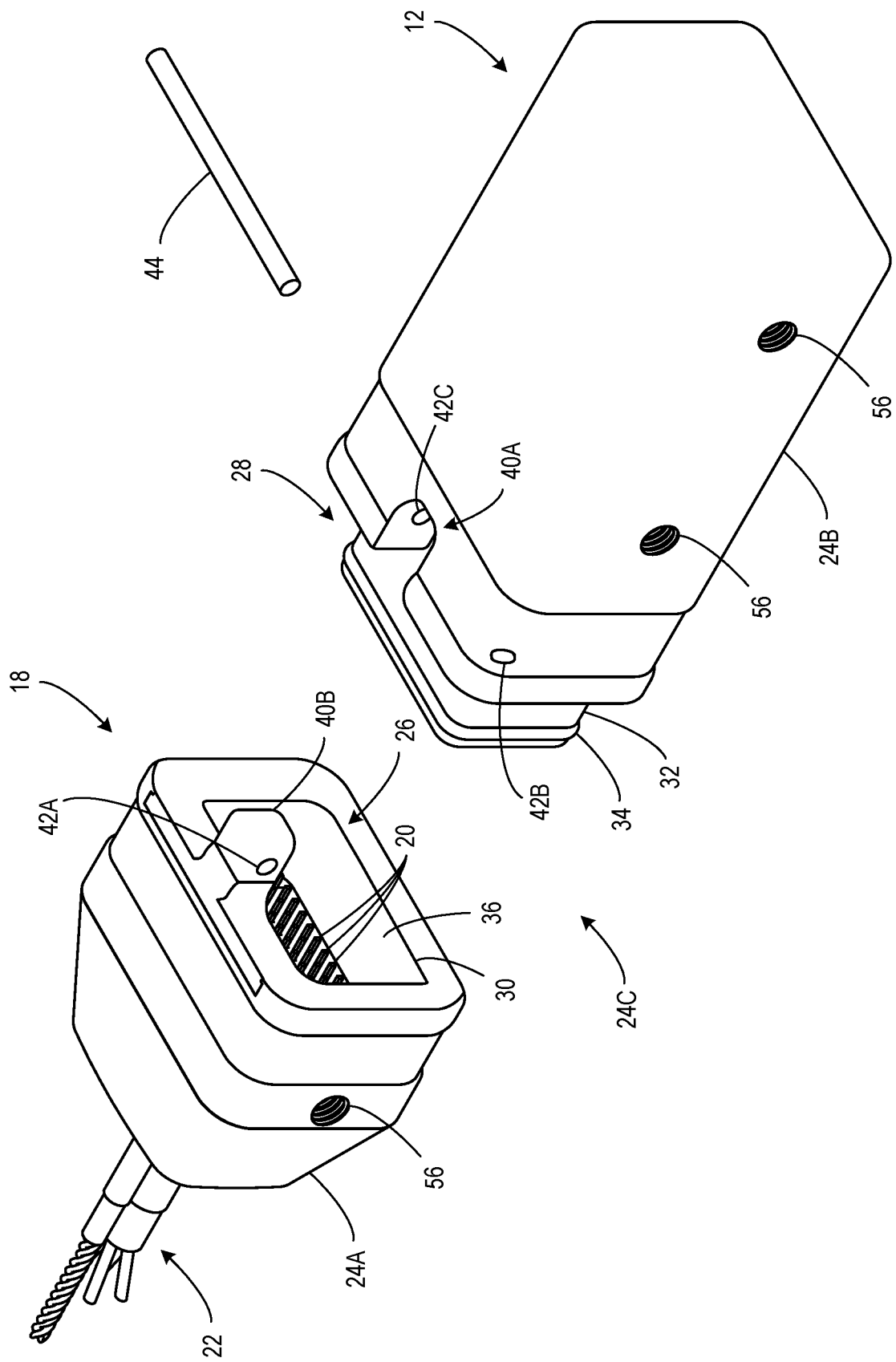
FIG. 9 shows a rear perspective view of the ruggedized edge computing assembly of FIG. 1.

As shown in FIGS. 8 and 9, in some examples, the interface 24C may include a female part 26 and a male part 28, each of which is integral with a respective one of the two portions 24A, 24B. As illustrated, the female part 26 is integral with the field connector portion 24A and the male part 28 is integral with the edge computing device portion 24B, but the opposite configuration may be adopted instead. The female part 26 may be configured to engage with the male part 28 to fasten the two portions 24A, 24B together. The male part 28 may be inserted into an opening 30 of the female part 26 to thereby connect edge computing device 12 to the pins 20 of the field connector 18. The male part 28 and female part 26 may snap fit together in some instances.

The male part 28 may include a projection 32 having an outer circumference and a hermetic seal 34 around the outer circumference. The hermetic seal 34 may reduce entry of dust, moisture, and other contaminants into the internal electrical components of the ruggedized edge computing assembly 10 by sealing between the outer circumference of the projection 32 and an inner surface 36 of the female part 26. The hermetic seal 34 may be an o-ring. As shown in FIG. 8, the interface 24C may further comprise a first planar surface 38 outward of, and longitudinally displaced from, the projection 32 such that a stair step is formed in one of the two portions 24A, 24B. In the illustrated example, the stair step is formed in the edge computing device portion 24B.

The two portions 24A, 24B may be fastened together by a mechanical restraint, which may take one of many possible forms. For example, a clip, slide lock, or screw may be utilized. As in the depicted example (see FIGS. 8 and 9), each of the two portions 24A, 24B may include a respective one of a female fastener part 40A and a male fastener part 40B configured to engage together. The female and male fastener parts 40A, 40B may each have at least one through-hole (here, one through-hole 42A in the male fastener part 40B and two through-holes 42B, 42C in the female fastener part 40A) configured to align when the two portions 24A, 24B of the housing 24 are joined together and the female and male fastener parts 40A, 40B are engaged. When aligned, the through-holes 42A, 42B, 42C may form a single, straight through-hole. The housing 24 may further comprise a pin 44 configured to be accommodated in the through-holes 42A, 42B, 42C to fasten the two portions 24A, 24B together. The mechanical restraint may increase the resistance to separation of the two portions 24A, 24B of the housing 24.

Figure 10:
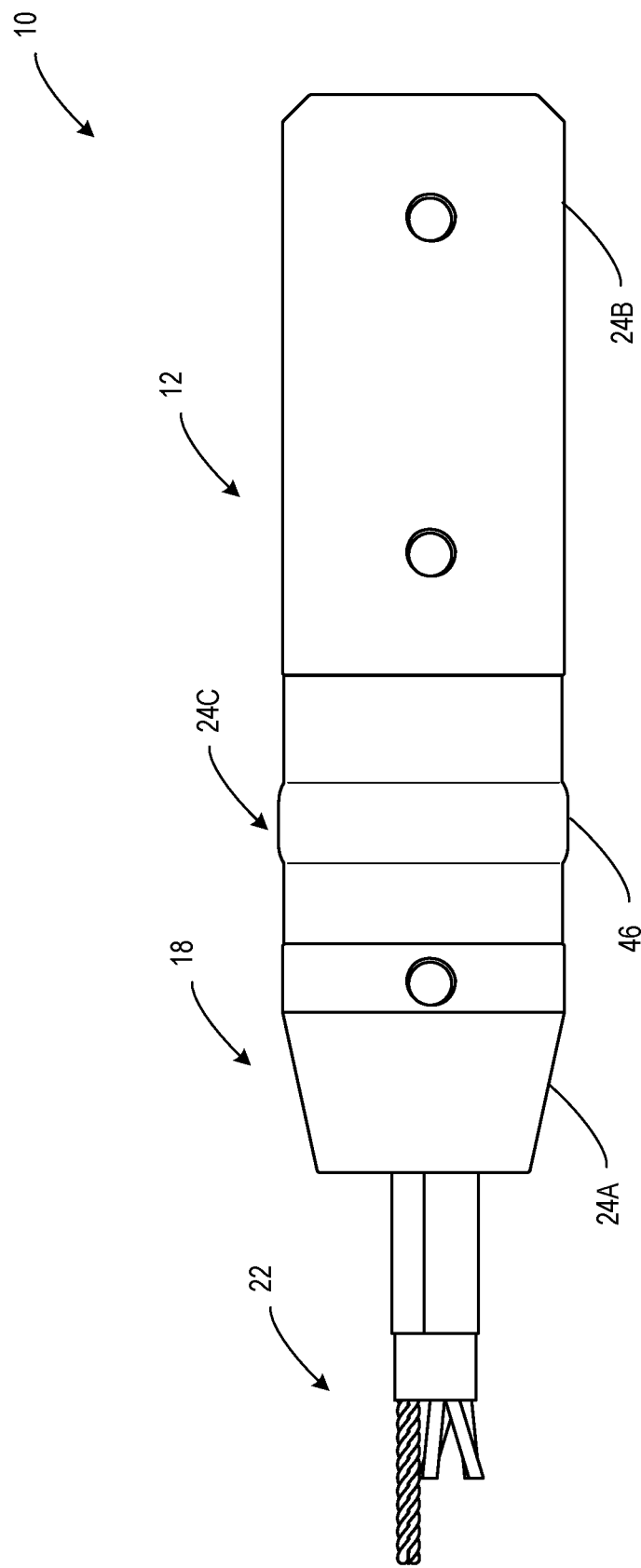
FIG. 10 shows a view of the ruggedized edge computing assembly of FIG. 1 having an external seal.

Turning to FIG. 10, in order to seal the housing 24 around the interface 24C, after the optional mechanical restraint is engaged, the housing 24 may further comprise an external seal 46 configured to wrap around the interface 24C to seal the two portions 24A, 24B together. For example, the external seal 46 may be heat shrinked to conform to the contours of the interface 24C and provide a tight barrier to dust, moisture, and other contaminants. The external seal 46 may cover and secure the mechanical restraint. One or more circumferential recess 48 (see FIGS. 6 and 7) may optionally be formed around the housing 24 in order to accommodate the external seal 46. The external seal 46 and the hermetic seal 34 may both aid the ruggedized edge computing assembly 10 in meeting or exceeding Ingress Protection (IP) Code IP68 by acting as a barrier to the ingress of contaminants.

Figure 11:
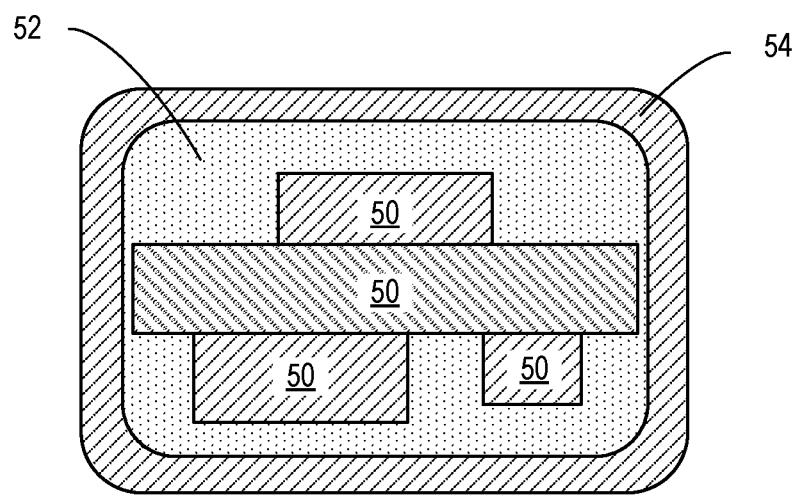
FIG. 11 shows a schematic cross-sectional view of the ruggedized edge computing assembly of FIG. 1.

FIG. 11 shows a schematic cross-sectional view of the ruggedized edge computing assembly 10. As can be seen, a cross section of the housing 24 perpendicular to a longitudinal direction may be substantially rectangular with radius corners. The longitudinal direction may be defined as the direction in which the ruggedized edge computing assembly is most elongated. Here, the longitudinal direction is also a direction in which the field connector 18 and the edge computing device 12 are arranged to connect together. In FIG. 11, various internal components 50 such as the processor 14 and memory 16, which may be formed independently and mounted together, or formed as a System-on-Chip (SoC), are shown within the housing 24.

The housing 24 may comprise an inner layer 52 that is a thermal conductor and an electrical insulator. The inner layer 52 may substantially fill all voids around the circuitry of the edge computing device 12 and provide both mechanical rigidity to resist impacts and thermal conductivity to dissipate heat away from sensitive electronic components, while also protecting the device from shorts due to electrical insulation. The housing 24 may comprise an outer layer 54 that is a thermal conductor. By using the dual layers of the housing 24 for thermal regulation, it may be possible to omit fans and other moving parts from the edge computing device 12, which may both increase the impact resistance of the device and decrease the size if so desired. An optional radio frequency (RF) shield may be fitted around the ruggedized edge computing assembly for further protection.

Because the inner layer 52 is already provided to fill in the voids, it may not be necessary to use an electrical insulator for the outer layer 54 which may not contact any electrical components through the inner layer 52. Rather, the outer layer 54 may be formed of a material that is more impact resistant than the inner layer 52, which may be indicated by having a higher durometer hardness, for example. The inner and outer layers 52, 54 may each be formed of a respective polymer material. The polymer material may be a single polymer or a blend of polymer materials such as polyamide, polycarbonate, acrylonitrile butadiene styrene, and polyethylene terephthalate. In some examples, the polymer material of the inner layer 52 may be a modified polyamide or epoxy. In some examples, the polymer material of the outer layer 54 may be a polytetrafluoroethylene and polyamide blend.

Figure 12:
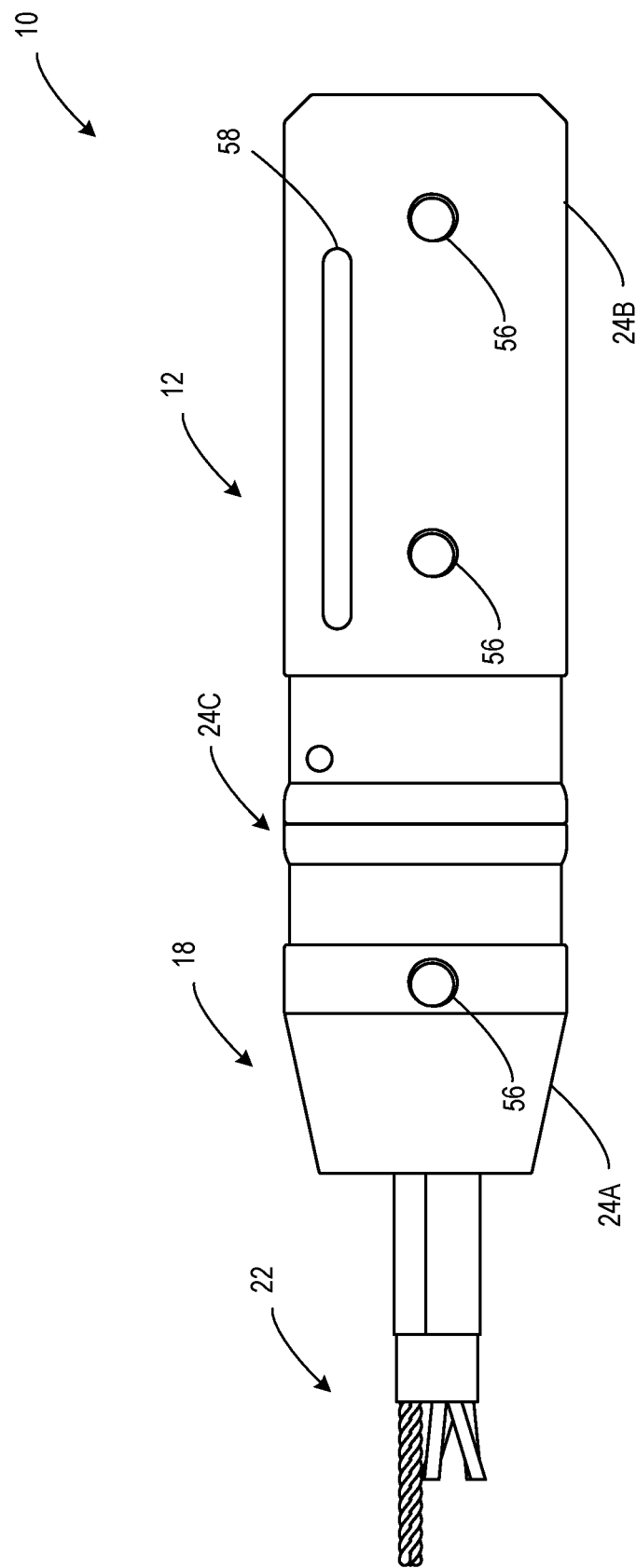
FIG. 12 shows a view of the ruggedized edge computing assembly of FIG. 1 having a slot configured to accommodate a strap.
Figure 13:
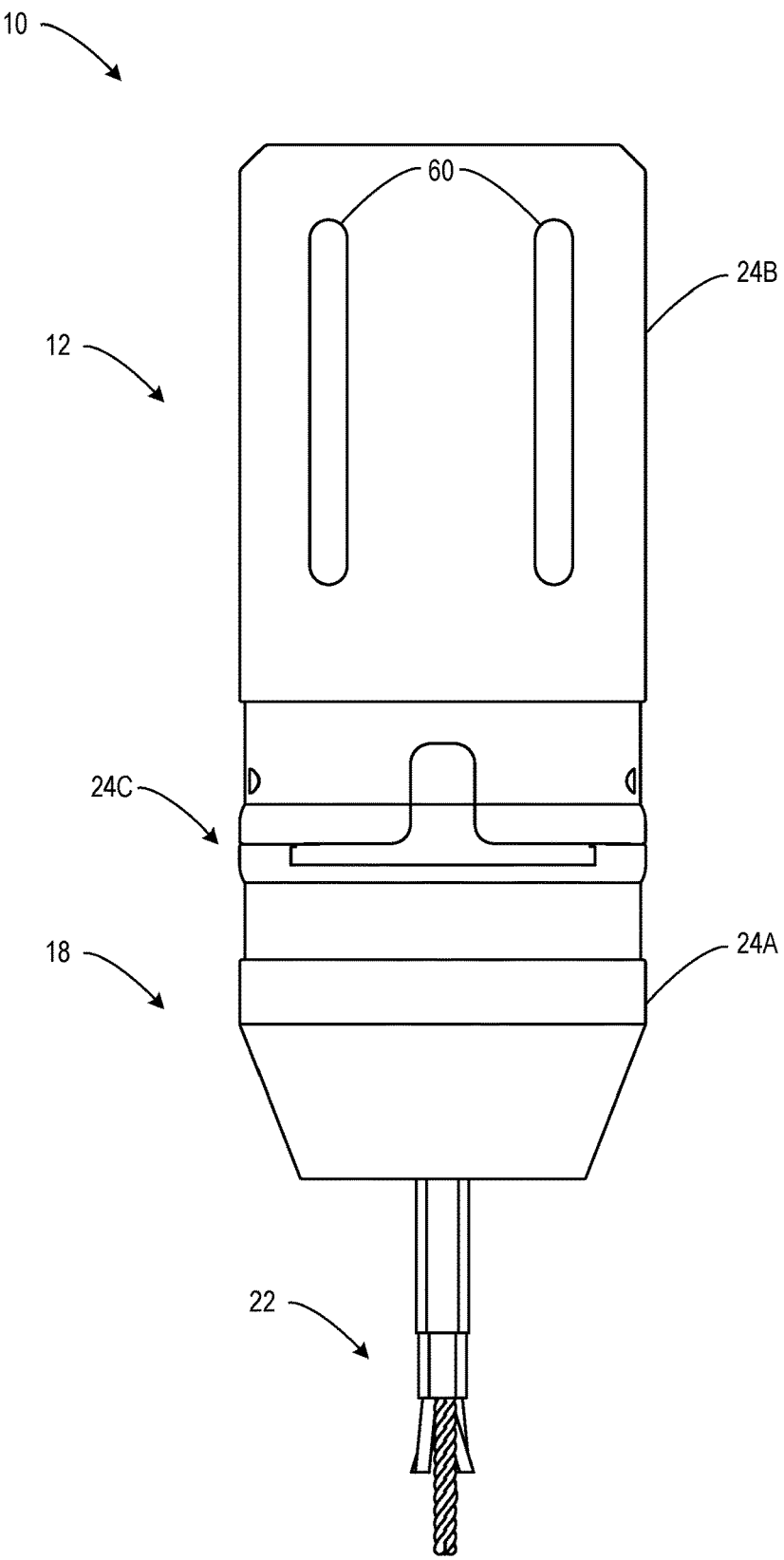
FIG. 13 shows a view of the ruggedized edge computing assembly of FIG. 1 having mounting ridges.

Turning to FIGS. 12 and 13, various features may be utilized to mount or attach the ruggedized edge computing assembly 10 to another object. As shown in FIG. 12, the housing 24 may further comprise at least one threaded hole 56 for mounting the ruggedized edge computing assembly 10 to an object. A threaded fastener such as a screw or bolt may be inserted into the threaded hole 56 to fasten the ruggedized edge computing assembly 10 to the object. It will be appreciated that features such as the threaded hole 56 formed in the housing 24 around the edge computing device 12 may not protrude through both layers of the housing in order to reduce the risk of particle intrusion. The object may be, to provide merely a few examples, an industrial machine, a frame for installing the ruggedized edge computing assembly 10 at a location, a vehicle, or a wearable object.

Other features may be included together or alternatively to the threaded hole 56. FIG. 12 shows that the housing 24 may further comprise a slot 58 configured to accommodate a strap. The strap may be a belt, harness, hook and loop fabric fastener, etc. By inserting the strap through the slot 58, the ruggedized edge computing assembly 10 may be firmly and securely attached to the object. FIG. 13 shows that additionally or alternatively, the ruggedized edge computing assembly 10 may include mounting ridges 60 configured to mate with corresponding ridges on the object. The stiffness of the material of the outer layer 54 of the housing 24 may be suitable to allow the corresponding ridges to removably snap into place within the mounting ridges 60. The overall dimensions of the ruggedized edge computing assembly 10 may range from approximately 1"×1"×4" to 2"×2"×8", depending on the various peripheral devices and external features included in the assembly. Although larger sizes are possible, the small form factor of the ruggedized edge computing assembly 10 may provide for easy wearability and allow for direct installation in hazardous locations, while the ruggedization may prevent premature failure from being used in such an environment.

Figure 14:
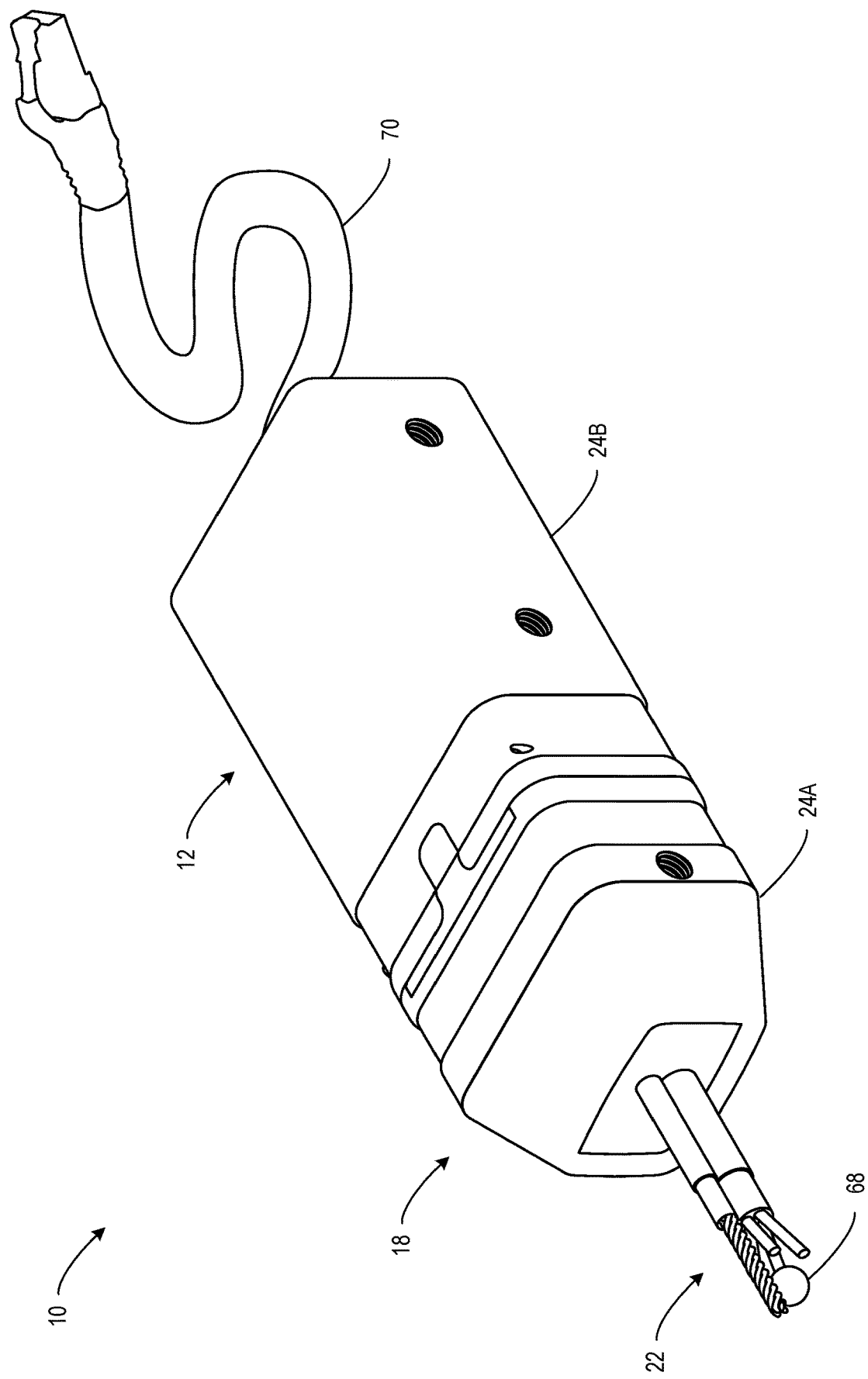
FIG. 14 shows a view of the ruggedized edge computing assembly of FIG. 1 having a direct mount sensor and an ethernet cable.

FIG. 14 shows additional features of the ruggedized edge computing assembly 10. The coupling 22 of the field connector 18 may be at least one cable 62 respectively corresponding to at least one pin 20 of the plurality of pins 20. The pins 20 of the field connector 18 may be electrically connected to pins 64 (see FIG. 8) of the processor 14. The cable 62, pins 20 of the field connector 18, and pins 64 of the processor 14 may correspond in a 1:1:1 relationship, but it will be appreciated that more than one pin may correspond to a cable 62, more than one cable 62 may correspond to a pin, and so on. The at least one cable 62 may be provided with one or more sheath 66 (see FIGS. 3 and 4) and the field connector 18 may taper toward the sheaths 66. The at least one cable 62 may be sealed or overmolded to become an integral part of the field connector 18 during manufacturing and reduce opportunity for particle ingress. Similarly, additional features may be incorporated into the field connector 18 with overmolding, such as external memory, wireless communication devices, switches, status indicators, and display screens, without lowering its ruggedization.

As shown in FIG. 1, the controlled device 2 may be one of a plurality of controlled devices 2 and the at least one cable 62 may be a plurality of cables 62, each of a type corresponding to a respective one of the plurality of controlled devices 2. The cable type may determine whether the cable 62 and controlled device 2 conform to a specification regarding the shape of a connector tip, wires used within the cable, protocols followed, etc. The cable type may be used for, for example, a serial connection (e.g., universal serial bus (USB), RS-232), fieldbus connection (e.g., GPIB, MAP, MMS, MODBUS, PROFIBUS, INTERBUS, CAN, etc.), local area network (LAN) connection (e.g., wired LAN over Ethernet/IP), or other suitable local connection. Some controlled devices 2 may be accessible via a wireless network as well. In addition, some controlled devices 2 may use multiple cables 62 to be controlled by the ruggedized edge computing assembly 10. The length of each cable 62 may be customized according to the end user requirements.

In some examples, the coupling 22 may be a direct mount arrangement. FIG. 14 shows one example of the ruggedized edge computing assembly 10 including a sensor 68 directly mounted to the field connector 18 rather than being mounted on the controlled device 2 and communicating with the ruggedized edge computing assembly 10 via a long cable or through a more sophisticated controlled device 2, as the sensor 3 may be. This arrangement can provide sensor readings at the location of the ruggedized edge computing assembly 10 and can bypass a controlled computing device. FIG. 14 further illustrates that in some examples, the processor 14 may be configured to receive power over ethernet from an ethernet cable 70 located separately from the interface 24C. The ethernet cable may be an RJ24 connector. Here, where the field connector 18 is considered the front, the ethernet cable 70 may protrude from the rear of the ruggedized edge computing assembly 10. The ethernet cable 70 may provide power and/or internet access for communication with the remote computing device 5, etc. Utilizing the ethernet cable 70 may remove dependence on the controlled device 2 for power. However, as shown in FIG. 9, the plurality of pins 20 may be an array of pins 20. The size of the array may vary according to how many pins 20 and cables 62 are needed. The illustrated example shows a 12×5 array of 50 pins 20. In some examples, the processor may be configured to receive power from the controlled device 2 via the plurality of pins 20. Utilizing the controlled device 2 for power may allow the ethernet cable 70 to be omitted, removing one potential entry point for contaminants into the housing. Without the ethernet cable 70, the edge computing device portion 24B of the housing 24 may have no openings or seals outside of the interface 24C with the field connector 18.

Figure 15:
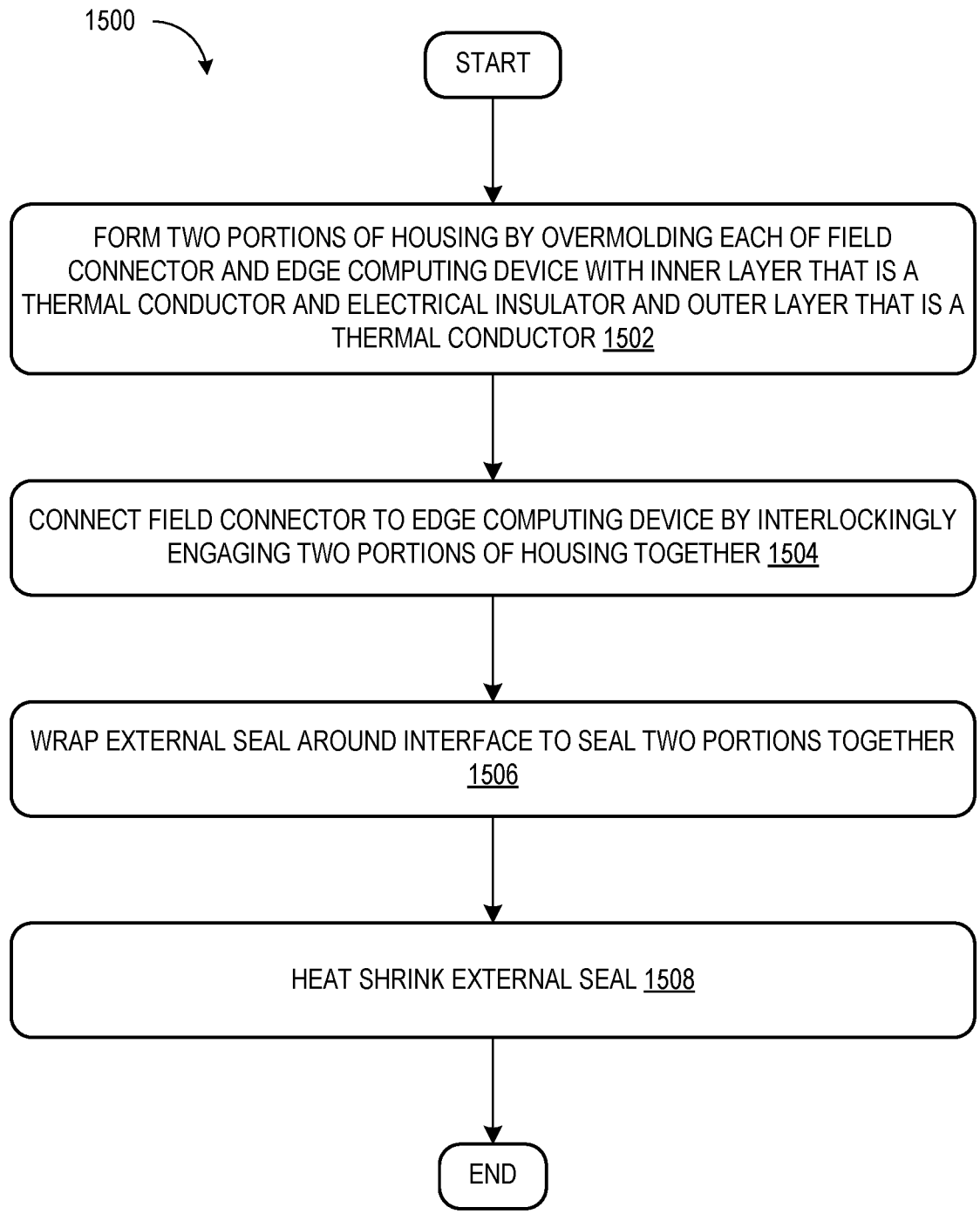
FIG. 15 shows a flowchart of a method of assembling the ruggedized edge computing assembly of FIG. 1.

FIG. 15 is a flowchart of a method 1500 of assembling a ruggedized edge computing assembly. The following description of method 1500 is provided with reference to the ruggedized edge computing assembly 10 described above and shown in FIGS. 3-14.

At 1502, the method 1500 may include forming the two portions of the housing by overmolding each of the field connector and the edge computing device with an inner layer that is a thermal conductor and an electrical insulator and an outer layer that is a thermal conductor. As discussed above, forming the two portions separately may allow the hardware of the edge computing device to be mass manufactured in an identical or similar form, while the field connector may be customized based on the type of the controlled devices 2 expected to be controlled. At 1504, the method 1500 may include connecting the field connector to the edge computing device by interlockingly engaging the two portions of the housing together.

To decrease the occurrence of particle ingress into the ruggedized computing assembly, at 1506, the method 1500 may include wrapping an external seal around the interface to seal the two portions together. To further ruggedize the seal, at 1508, the method 1500 may include heat shrinking the external seal.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A ruggedized edge computing assembly, comprising:
   an edge computing device, comprising a processor configured to control a controlled device;
   a field connector, configured to connect to the edge computing device via a plurality of pins and to the controlled device via a coupling; and
   a housing overmolded around each of the field connector and the edge computing device, the housing including two portions which are a field connector portion configured to accommodate the field connector and an edge computing device portion configured to accommodate the edge computing device, the two portions being configured to interlockingly engage together at an interface.

2. The ruggedized edge computing assembly of claim 1, wherein the interface includes a female part and a male part, each of which is integral with a respective one of the two portions, the female part configured to engage with the male part to fasten the two portions together.

3. The ruggedized edge computing assembly of claim 2, wherein the male part includes a projection having an outer circumference and a hermetic seal around the outer circumference.

4. The ruggedized edge computing assembly of claim 3, wherein the interface further comprises a first planar surface outward of, and longitudinally displaced from, the projection such that a stair step is formed one of the two portions.

5. The ruggedized edge computing assembly of claim 1, wherein the housing further comprises an external seal configured to wrap around the interface to seal the two portions together.

6. The ruggedized edge computing assembly of claim 1, wherein
   each of the two portions include a respective one of a female fastener part and a male fastener part configured to engage together,
   the female and male fastener parts each have at least one through-hole configured to align when the two portions of the housing are joined together and the female and male fastener parts are engaged, and
   the housing further comprises a pin configured to be accommodated in the through-holes to fasten the two portions together.

7. The ruggedized edge computing assembly of claim 1, wherein the housing comprises:
   an inner layer that is a thermal conductor and an electrical insulator; and
   an outer layer that is a thermal conductor.

8. The ruggedized edge computing assembly of claim 7, wherein the inner and outer layers are each formed of a respective polymer material.

9. The ruggedized edge computing assembly of claim 7, wherein the outer layer is formed of a material that is more impact resistant than the inner layer.

10. The ruggedized edge computing assembly of claim 1, wherein the coupling of the field connector is at least one cable respectively corresponding to at least one pin of the plurality of pins.

11. The ruggedized edge computing assembly of claim 10, wherein the controlled device is one of a plurality of controlled devices and the at least one cable is a plurality of cables each of a type corresponding to a respective one of the plurality of controlled devices.

12. The ruggedized edge computing assembly of claim 1, wherein the coupling is a direct mount arrangement.

13. The ruggedized edge computing assembly of claim 1, wherein the plurality of pins is an array of pins.

14. The ruggedized edge computing assembly of claim 1, wherein the processor is configured to receive power from the controlled device via the plurality of pins.

15. The ruggedized edge computing assembly of claim 1, wherein the processor is configured to receive power over ethernet from an ethernet cable located separately from the interface.

16. The ruggedized edge computing assembly of claim 1, wherein a cross section of the housing perpendicular to a longitudinal direction is substantially rectangular with radius corners.

17. The ruggedized edge computing assembly of claim 1, wherein the housing further comprises at least one threaded hole for mounting the ruggedized edge computing assembly to an object.

18. The ruggedized edge computing assembly of claim 1, wherein the housing further comprises a slot configured to accommodate a strap.

19. The ruggedized edge computing assembly of claim 1, wherein the ruggedized edge computing assembly meets Ingress Protection (IP) Code IP68.

20. A method of assembling the ruggedized edge computing assembly of claim 1, the method comprising:
   forming the two portions of the housing by overmolding each of the field connector and the edge computing device with an inner layer that is a thermal conductor and an electrical insulator and an outer layer that is a thermal conductor; and
   connecting the field connector to the edge computing device by interlockingly engaging the two portions of the housing together.

21. The method of claim 20, further comprising:
   wrapping an external seal around the interface to seal the two portions together; and
   heat shrinking the external seal.

22. A ruggedized edge computing assembly, comprising:
   an edge computing device, comprising a processor configured to control a controlled device;
   a field connector, configured to connect to the edge computing device via a plurality of pins and to the controlled device via a coupling; and
   a housing overmolded around each of the field connector and the edge computing device, the housing including two portions which are a field connector portion configured to accommodate the field connector and an edge computing device portion configured to accommodate the edge computing device, the two portions being configured to interlockingly engage together at an interface, wherein the interface includes a female part and a male part, each of which is integral with a respective one of the two portions, the female part configured to engage with the male part to fasten the two portions together, and the housing comprises:
    an inner layer that is a thermal conductor and an electrical insulator; and
    an outer layer that is a thermal conductor.

\* \* \* \* \*